UNITED STATES PATENT OFFICE.

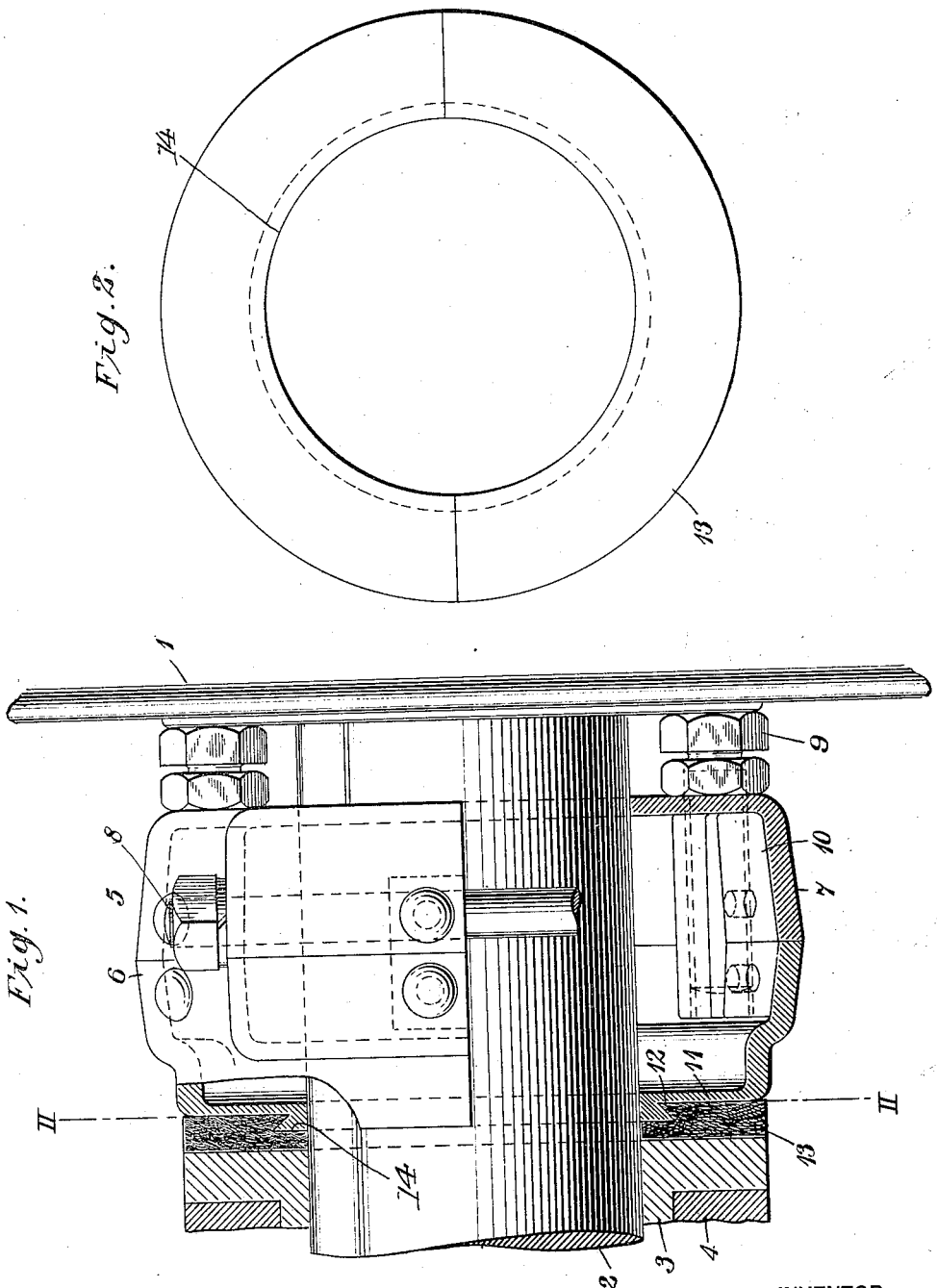

WILLIAM C. ORR, OF EAST PITTSBURGH, PENNSYLVANIA, ASSIGNOR TO WESTINGHOUSE ELECTRIC AND MANUFACTURING COMPANY, A CORPORATION OF PENNSYLVANIA.

WEARING-PLATE FOR AXLE-COLLARS.

1,245,960.      Specification of Letters Patent.      Patented Nov. 6, 1917.

Application filed March 7, 1916. Serial No. 82,627.

*To all whom it may concern:*

Be it known that I, WILLIAM C. ORR, a citizen of the United States, and a resident of East Pittsburgh, in the county of Allegheny and State of Pennsylvania, have invented a new and useful Improvement in Wearing-Plates for Axle-Collars, of which the following is a specification.

My invention relates to shaft-encircling members for axle collars that are commonly employed for spacing vehicle wheels from the bearings of motor-driven axles of electric railway vehicles.

The object of my invention is to provide a simple and inexpensive method for securing suitable wearing-plates between the axle collars and the bearings.

Wearing-plates have usually been secured to axle collars by rivets or bolts the use of which necessitated the drilling of holes in the shaft-encircling members and the wearing-plates. According to the present invention, I provide a wearing-plate that may be secured to a shaft-encircling member by a few simple operations and without the use of rivets or bolts.

In the accompanying drawings, Figure 1 is a view, partially in section and partially in side elevation, of a divided axle collar provided with a wearing-plate formed in accordance with my invention, and Fig. 2 is a sectional view along the line II of Fig. 1.

Referring to Fig. 1, a wheel 1 is mounted on a suitable shaft or axle 2 that is adapted to be driven by an electric motor or other suitable means (not shown). The axle 2 is rotatably mounted in a bearing 3 that is supported by a portion 4 of the motor frame. The bearing 3 is spaced a predetermined distance from the wheel 1 by a divided axle collar 5. The collar 5 comprises a pair of substantially identical shaft-encircling members 6 and 7 which are secured together by means of bolts 8. The axle collar, as a whole, is spaced from the wheel 1 by means of bolts 9 coacting with threaded lugs 10 that are provided on each shaft-encircling member. Each of the shaft-encircling members 6 and 7 is of substantially cup-shape and is provided with an annular rim portion 11 that is substantially parallel to the adjacent face of the bearing 3. The portion 11 is provided with a peripheral groove 12 the bottom of which is inclined to the longitudinal axis of the axle collar 5. The groove 12 may be readily formed by a suitable machine tool before the members 6 and 7 of the axle collar 5 have been separated. An annular wearing plate 13, formed of some suitable fibrous material, is provided with a machined groove 14 similar in form to the groove 12. The depth of the groove 14 is substantially equal to the distance between the inner surface of the shaft-encircling members 6 and 7 and the edge of the groove 12. After the groove 14 has been formed, the plate 13 is divided and each half-portion thereof is secured to the members 6 and 7 by forcing the portions of the plate 13 adjacent to the groove 14 into the groove 12. The somewhat resilient nature of the fibrous material causes the ring to spring slightly and gives a tight fit between the ring and the shaft-encircling members, thereby preventing longitudinal displacement of the ring with respect to the axle collar.

While I have shown my invention in a simple and preferred form and as applied to a particular type of axle collar, it is not so limited but is capable of various modifications within the scope of the appended claims.

I claim as my invention:

1. An annular wearing plate provided with a groove having one face that is inclined to the longitudinal axis of said plate.

2. An annular wearing plate provided with a groove having faces that form an acute angle.

3. The combination with a shaft-encircling member and a wearing plate therefor, of means embodied in said member and said plate for preventing longitudinal displacement of said plate.

4. The combination with a shaft-encircling member and a wearing plate therefor, of means comprising coacting portions of said member and said plate for preventing longitudinal displacement of said plate.

5. The combination with a shaft-encircling member provided with an annular groove, of a wearing plate provided with an annular groove corresponding to said first-named groove, the portion of said member adjacent to said groove being adapted to fit into the groove of said plate to prevent longitudinal displacement thereof.

6. The combination with a shaft-encircling member provided with an annular groove, one face of which is inclined to the axis of said member, of a wearing plate provided with a groove corresponding to said first-named groove, the portion of said member adjacent to the inclined face of said groove being adapted to fit into the groove of said plate to prevent longitudinal displacement thereof.

In testimony whereof, I have hereunto subscribed my name this 29th day of Feb. 1916.

WM. C. ORR.